United States Patent [19]

Redman

[11] 4,138,196

[45] Feb. 6, 1979

[54] FIBER INTERFEROMETER ROTARY MOTION SENSOR

[75] Inventor: Charles M. Redman, Las Cruces, New Mex.

[73] Assignee: The United States of America as represented by the Secretary of the Army, Washington, D.C.

[21] Appl. No.: 813,362

[22] Filed: Jul. 6, 1977

[51] Int. Cl.$^2$ .............................................. G01B 9/02
[52] U.S. Cl. ............................... 356/350; 350/96.11; 350/96.17
[58] Field of Search .............. 356/106 LR; 350/96.11, 350/96.12, 96.13, 96.14, 96.17

[56] References Cited

U.S. PATENT DOCUMENTS

| 3,589,794 | 6/1971 | Marcatilli | 350/96.10 |
| 3,666,349 | 5/1972 | Hubby, Jr. | 350/149 |
| 3,714,607 | 1/1973 | Cutler | 356/106 LR X |
| 3,841,758 | 10/1974 | Gievers | 356/106 LR |
| 3,846,025 | 11/1974 | Wilber | 356/106 LR |
| 3,910,373 | 10/1975 | Newburgh et al. | 350/106 LR X |
| 4,013,365 | 3/1977 | Vali et al. | 356/106 LR |

FOREIGN PATENT DOCUMENTS

| 1807247 | 5/1970 | Fed. Rep. of Germany | 356/106 LR |
| 1955911 | 11/1970 | Fed. Rep. of Germany | 356/106 LR |

OTHER PUBLICATIONS

Stone, et al., "Nd:Yag Single-Crystal Fiber Laser, "*Appl. Phys. Lett.*, vol. 29, No. 1, Jul. 1976, pp. 37-39.
"Fiber Beampaths Expected to Enhance Laser Gyro's Accuracy and Slash Cost", *Laser Focus*, vol. 11, No. 6, Jun. 1975.

*Primary Examiner*—John K. Corbin
*Assistant Examiner*—Matthew W. Korch
*Attorney, Agent, or Firm*—Nathan Edelberg; Robert P. Gibson; Saul Elbaum

[57] ABSTRACT

A rotary motion sensor which employs a fiber interferometer more particularly comprises a system for driving a laser interferometer and electronically detecting the fringe shifts caused by rotation. In the preferred embodiment, a light emitting diode pumps a fiber laser which, in turn, drives a distribution waveguide. Coherent radiation from the distribution waveguide is partly backward-coupled by means of an acousto-optic grating into a reference optical waveguide. The acousto-optic grating also serves to offset the laser frequency by the acoustic drive frequency. Coherent radiation from the distribution waveguide is also coupled into each end of a multiple turn optical waveguide which serves as a fiber interferometer. A pair of directional couplers, one for the clockwise radiation and one for the counter-clockwise radiation, extract the coherent radiation from the fiber interferometer after the radiation has made at least one transversal of the multiple turn optical waveguide. The respective clockwise and counter-clockwise signals will be phase shifted in proportion to the rotational rate of the system, and these phase shifted signals from the directional couplers are separately heterodyned in a pair of detectors with the offset coherent radiation signal from the reference optical waveguide. The output from the respective detectors comprise two signals at the acousto-optic drive frequency which have the same phase relationship as the coherent optical signals. The relative phase between the two acoustic signals may be detected by conventional electronics to provide a measure of the rotation rate of the system.

10 Claims, 2 Drawing Figures

FIBER INTERFEROMETER ROTARY MOTION SENSOR

RIGHTS OF THE GOVERNMENT

The invention described herein may be manufactured, used, and licensed by or for the United States Government for governmental purposes without the payment to me of any royalty thereon.

BACKGROUND OF THE INVENTION

1. Field of the Invention

The present invention is related to rotary motion sensors and, more particularly, is directed towards a rotary motion sensor which employs a multiple turn fiber interferometer.

2. Description of the Prior Art

Various devices have been developed which utilize a fundamental phenomenon, sometimes referred to as the Sagnac interferometer effect, the early exploratory work in this field having been accomplished by Sagnac, Michaelson and others. Sagnac demonstrated that light traversing a closed path experiences an apparent path length change when the closed path is rotated about an axis perpendicular to the plane containing the closed path. He demonstrated that the apparent path length increased in the direction of rotation and decreased in the opposite direction.

With the advent of the laser and coherent optical radiation, devices known as laser gyroscopes have been constructed based upon Sagnac's theory, and have been developed into precision instruments for measuring rotary motion. In a laser gyro, a closed optical circuit or ring is established by the laser and mirrors about which coherent light is propagated in two directions, clockwise and counter-clockwise. The path lengths about the ring are frequency determining parameters of the clockwise and counter-clockwise lasing. Increasing the path length by rotation causes a decrease in frequency, while decreasing the path length causes a frequency increase. The beat frequency between the clockwise and counter-clockwise laser beams is directly proportional to the rotational rate of the apparatus.

The laser gyro, however, has not been widely adopted as a result of several serious problems. One such problem is known as the lock-in problem which results from the tendency of the clockwise (CW) radiation and the counter-clockwise (CCW) radiation to lock together in frequency as the rotation of the gyro slows until it reaches a point where the radiation in the CW direction scatters from imperfections in the path and mixes with the CCW radiation, and vice versa. When lock-in occurs, the rotation rate can no longer be determined as a frequency difference. Many proposals have been advanced, as evidenced by, for example, U.S. Pat. Nos. 3,846,025; 3,841,758; and 3,714,607, whose primary objectives are to obviate the frequency locking problems of ring laser rotary motion sensors.

Up until recently, the interferometer did not receive much interest as a technique for measuring rotation, since it is not as sensitive as the laser gyro. However, with the development of glass and single crystal waveguides for use with optical and infrared coherent radiation, the interferometer having multiple optical turns has become a viable solution for precise rotation measurements. Experiments performed at the University of Utah by Vali and Shorthill have demonstrated the validity of this concept, as published in the June, 1975 issue of *Laser Focus*.

The concept as suggested by Vali and Shorthill, while demonstrating feasibility, nevertheless made no suggestion as to the manner of adopting the principle to perform as a practical, field worthy device which may be utilized, for example, in missiles for measuring rotation rate and attitude. Present techniques for accomplishing the latter, for example, require very expensive optical systems for tracking the missile by taking photographs which must later be manually reduced to obtain information as to the missile attitude versus time. In addition to being labor intensive, the manual data reduction takes many months to accomplish, and requires expensive labor and equipment.

It is therefore clear from the foregoing that it would be quite advantageous if the multiple turn laser interferometer principle could somehow be adapted for use into a rugged, field worthy device for use in missles, aircraft, and other vehicles with limited space and very rigorous environments. If adapted for use, for example, in tracking missile attitude versus time, such a device could achieve more accurate data, at longer ranges, and be far less expensive than presently used optical systems. The data could additionally be obtained far quicker than presently available.

One of the difficulties encountered in the utilization of a fiber interferometer for rotary motion sensing are the extremely high laser frequencies with which one must deal. In a missle-mounted system, it may be appreciated that it would be extremely advantageous if ordinary electronic instrumentation could be utilized to detect and process the measurement signals generated by such a device. However, the prior art does not suggest how this may be accomplished with lasing frequencies on the order of $10^{14}$Hz.

OBJECTS AND SUMMARY OF THE INVENTION

It is therefore a primary object of the present invention to provide a fiber interferometer rotary motion sensor which overcomes all of the problems noted above with respect to prior art systems and techniques.

Another object of the present invention is to provide a rotary motion sensor which utilizes a multiple turn fiber interferometer which is compact, rugged, and field worthy for use in missiles, aircraft, and other vehicles with limited space and very rigorous environments.

An additional object of the present invention is to provide a fiber interferometer rotary motion sensor whose output signals may be processed by ordinary electronic instrumentation.

A still further object of the present invention is to provide a rotary motion sensor which utilizes a fiber interferometer whose output is accurate, which is inexpensive, may be quickly reduced, and easily installed into remote environments where such measurements need to be made.

The foregoing and other objects are attained in accordance with one aspect of the present invention through the provision of a rotary motion sensor, which comprises means for generating a coherent optical signal at a first frequency, a multiple turn fiber interferometer having first and second ends for respectively transmitting the coherent optical signal in first and second opposed directions therein, means for generating a reference optical signal offset in a frequency from the first frequency by a second frequency, means for mixing the coherent optical signals transmitted in the first and second directions with the reference optical signal to produce first and second signals each at the second frequency, and means for detecting the relative phase shift between the first and second signals.

More particularly, the means for generating the coherent optical signal preferably comprises a fiber laser, and a first waveguide is also provided for receiving the coherent optical signal from the fiber laser. The means for generating the reference optical signal is preferably positioned adjacent the first waveguide and also includes means for coupling a portion of the coherent optical signal from the first waveguide into a second waveguide also positioned adjacent the reference optical signal generating means.

In accordance with yet other aspects of the present invention, the means for generating the reference optical signal comprises an acousto-optical waveguide having transducer means positioned at one end thereof for generating traveling acoustic waves along the acousto-optic waveguide at said second frequency. Means are also provided, preferably in the form of a pair of directional couplers, for coupling the coherent optical signal from the first waveguide into the first and second ends of the multiple-turn fiber interferometer for producing a pair of signals traveling in the first and second opposed directions in the fiber interferometer. Means are also provided for extracting the pair of signals from the multiple turn fiber interferometer after said signals have each respectively traversed substantially the entire length of the fiber interferometer.

More particularly, the extracting means comprises another pair of directional couplers positioned respectively near the first and second ends of the fiber interferometer for receiving the optical signals traveling respectively in the second and first directions.

In accordance with another aspect of the present invention, the mixing means preferably comprises first and second heterodyne detectors, which may be diodes, each of which is connected to receive the reference optical signal from the second waveguide, and which are connected to receive the signals from the extracting pair of directional couplers, respectively.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENT

Figure 1:
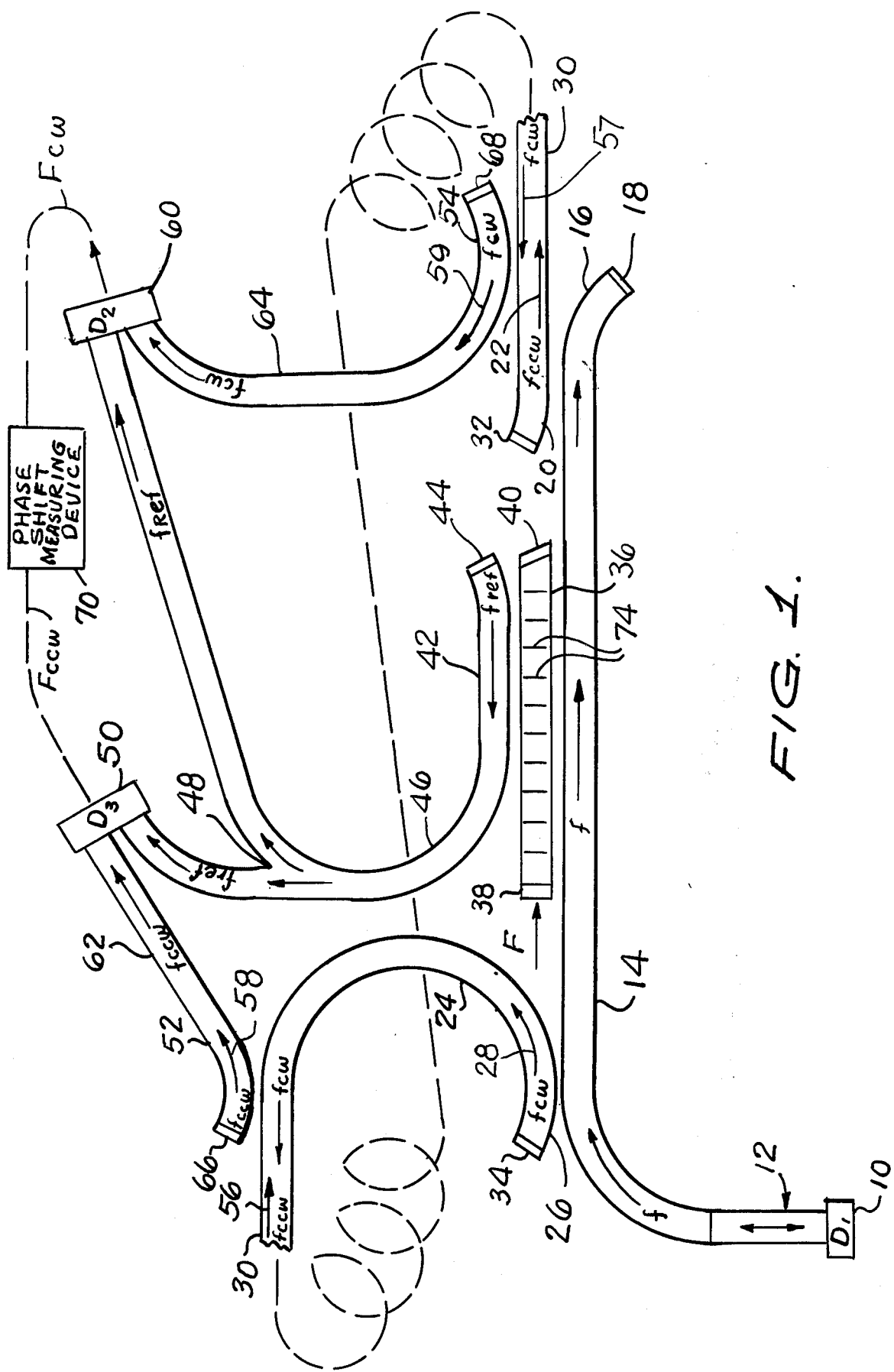
FIG. 1 is a schematic representation which illustrates the main components of a preferred embodiment of the fiber interferometer rotary motion sensor of the present invention.

FIG. 1 is a schematic illustration of a preferred embodiment of the present invention which consists essentially of a number of optical waveguides, couplers, and other devices arranged in such a fashion so as to couple optical energy into a multiple turn fiber interferometer, indicated by reference numeral 30, and extracted therefrom in such a fashion that it may be processed by standard electronic instrumentation to yield desired information proportional to the rotary motion of the system.

The system includes a light source 10 which may, for example, comprise a light emitting diode, for pumping a fiber laser 12 which produces a coherent optical lasing signal at the frequency f. The fiber laser 12 may, for example, comprise a miniaturized Nd:YAG laser such as, for example, that developed by Chesler and Draegert of Bell Laboratories.

The fiber laser 12 drives a distribution optical waveguide 14 which terminates in a directional coupler 16 and an absorber 18 for minimizing back scattering. The waveguide 14 and directional coupler 16 are preferably comprised of integrated optics which are becoming extremely popular for use in miniaturized optical systems, as examplified by Marcatili's U.S. Pat. No. 3,589,794.

The directional coupler 16 couples the coherent optical laser signal f into one end 20 of a multiple turn fiber interferometer 30. The multiple turn fiber interferometer 30 is comprised of an optical waveguide wound in a helical configuration and has one end 20 terminated by an absorber 32 and a second end 26 terminated by an absorber 34. The orientation of the multiple turns of the interferometer 30 are not shown in FIG. 1 for the sake of clarity, but it is understood that they lie in planes which are substantially perpendicular to the axis of rotation of the system.

The signal coupled from directional coupler 16 into the end 20 of interferometer 30 is designated by reference numeral 22 and is at the same optical frequency as the initial laser signal f but is denoted by the term $f_{CCW}$ to connote the counter-clockwise rotation thereof within the fiber interferometer 30.

The other end 24 of the multiple turn fiber interferometer 30 terminates in a directional coupler 26 which is positioned adjacent a portion of the distribution waveguide 14 such that the optical laser signal 28 is coupled thereinto from the waveguide 14. Note that the frequency of signal 28 is the same as the frequency of the coherent optical signal generated by laser 12, and that signal 28 is connoted by the term $f_{CW}$ to connote its clockwise rotation within fiber interferometer 30.

Positioned adjacent a length of the distribution waveguide 14 is an acousto-optic waveguide 36 down which an acousto-optic grating 74 moves as driven by acoustic waves that are set up in the waveguide 36 by a transducer 38 end-driven at an acoustic frequency F. The waveguide 36 terminates at a slight angle to minimize the effect of possible reflections. An acoustic absorbing material 40 is also provided for the same purpose.

The acousto-optic waveguide with the moving grating is provided as a means for partially backward coupling the coherent optical signal f into an adjacent directional coupler 42. The moving grating in the waveguide 36 also serves to offset the optical signal f by the acoustic drive frequency F such that the signal received in the directional coupler 42, denoted by $f_{REF}$ equals f-F. Directional coupler 42 also terminates in an absorber 44 and leads to an optical waveguide 46 which is branched by a power splitter 48 to deliver the optical reference signal $f_{ref}$ to a pair of diode heterodyne detectors 50 and 60.

Means are also provided for coupling out the clockwise and counter-clockwise optical signals from the multiple turn fiber interferometer 30 after they have had an opportunity to substantially completely traverse all the turns of the interferometer from one end to the other. Reference numeral 56 indicates the counterclockwise optical frequency signal which originated at the other end of the optical waveguide 20 as signal 22, while reference numeral 57 connotes the clockwise optical signal in interferometer 30 after it has substantially traversed the entire interferometer from its point of origination as signal 28.

Another pair of directional couplers 52 and 54 are respectively provided adjacent the ends of the fiber interferometer 30 as illustrated for coupling out the signals 56 and 57, respectively, as signals 58 and 59. Couplers 52 and 54, in turn, feed their respective signals 58 and 59 to a pair of optical waveguides 62 and 64 which, in turn, deliver the signals to diode heterodyne detectors 50 and 60, respectively. Couplers 52 and 54 also include absorbers 66 and 68, respectively, for minimizing disturbances.

It may be appreciated that rotation of the multiple turn optical waveguide fiber interferometer 30 about an axis normal to the plane of the turns of the waveguide will cause the apparent length of the waveguide to increase in the direction of the rotation and decrease in the opposite direction. This will, in turn, impart a phase shift to the signals 56 and 57 in proportion to this apparent path length change and, thus, the rotation rate. Note that signals 56 and 57, having substantially fully traversed the multiple turn fiber interferometer 30 from their respective initial positions 22 and 26, have achieved a maximum phase shift due to rotation. These phase-shifted signals 58 and 59, of the opposite sense, are each heterodyned in detectors 50 and 60, respectively, with the reference optical signal $f_{ref}$ which, it should be remembered, has not suffered a phase shift due to rotation.

Therefore, the output frequency of heterodyne detector 50 conists of a signal $F_{CCW}$ which is rotated in degrees the same amount as signal 58. However, the frequency of $F_{CCW}$ is identical to the acousto-optic drive frequency F impressed upon the acousto-optic grating 36. Accordingly, $F_{CCW}$ is a relatively low frequency signal rotating in phase the same as the high frequency signal $f_{CCW}$. However, $F_{CCW}$ is a much more manageable type of signal in terms of the capability of detecting and processing same by conventional electronics.

Similarly, diode heterodyne detector 60 mixes the signal 59 with the reference frequency signal $f_{ref}$ to produce the heterodyned difference frequency $F_{CW}$ which is a relatively low, acoustic frequency signal that is rotating in phase the same as the high frequency signal $f_{CW}$. The phase relationship between $F_{CCW}$ and $F_{CW}$ is therefore the same as that between $f_{CW}$ and $f_{CCW}$. The output from detectors 50 and 60 are therefore fed to a conventional electronic phase shift measuring device 70 for detecting and measuring the relative phase shift of one signal with respect to the other, which is a direct measure proportional to the rotary motion of the system. The device 70 may comprise, for example, a convention stop and start counter, a harmonic measuring device, or the like.

All of the components illustrated in FIG. 1 are preferably encapsulated in a matrix having an index of refraction $n_2$ which is slightly less than the index of refraction $n_1$ of the optical waveguides and whose acoustic velocity is slightly faster than that of the acousto-optic grating 36. These characteristics, along with transparency make the waveguides 14, 46, 30, 62 and 64 optical waveguides, while grating 36 is an acoustic waveguide. The characteristic of an optical waveguide is that energy traveling at a small angle to the center line of the guide leaves the core of the guide but is deflected by the faster (lower index of refraction) matrix surrounding the core of the guide back into the core. The region of the matrix next to the core of the guide, therefore, carries radiation with small angular excursions. The acousto-optic grating 36 similarly guides acoustic waves which are generated by transducer 38. Acoustic waves and optical waves, therefore, both occupy the region between the guides. The optical waves are scattered backward by the acoustic waves according to: $\lambda/\Lambda = \sin\theta + \sin\theta'$ where $\lambda$ is the wavelength of the laser signal f in the matrix, $\Lambda$ is the wavelength of the acoustic signal F, $\theta$ is the angle of propagation of the radiation f with respect to the center line of grating 74, and $\theta'$ is the angle of backward deflection of the radiation f as it is scattered by the grating 74.

Figure 2:
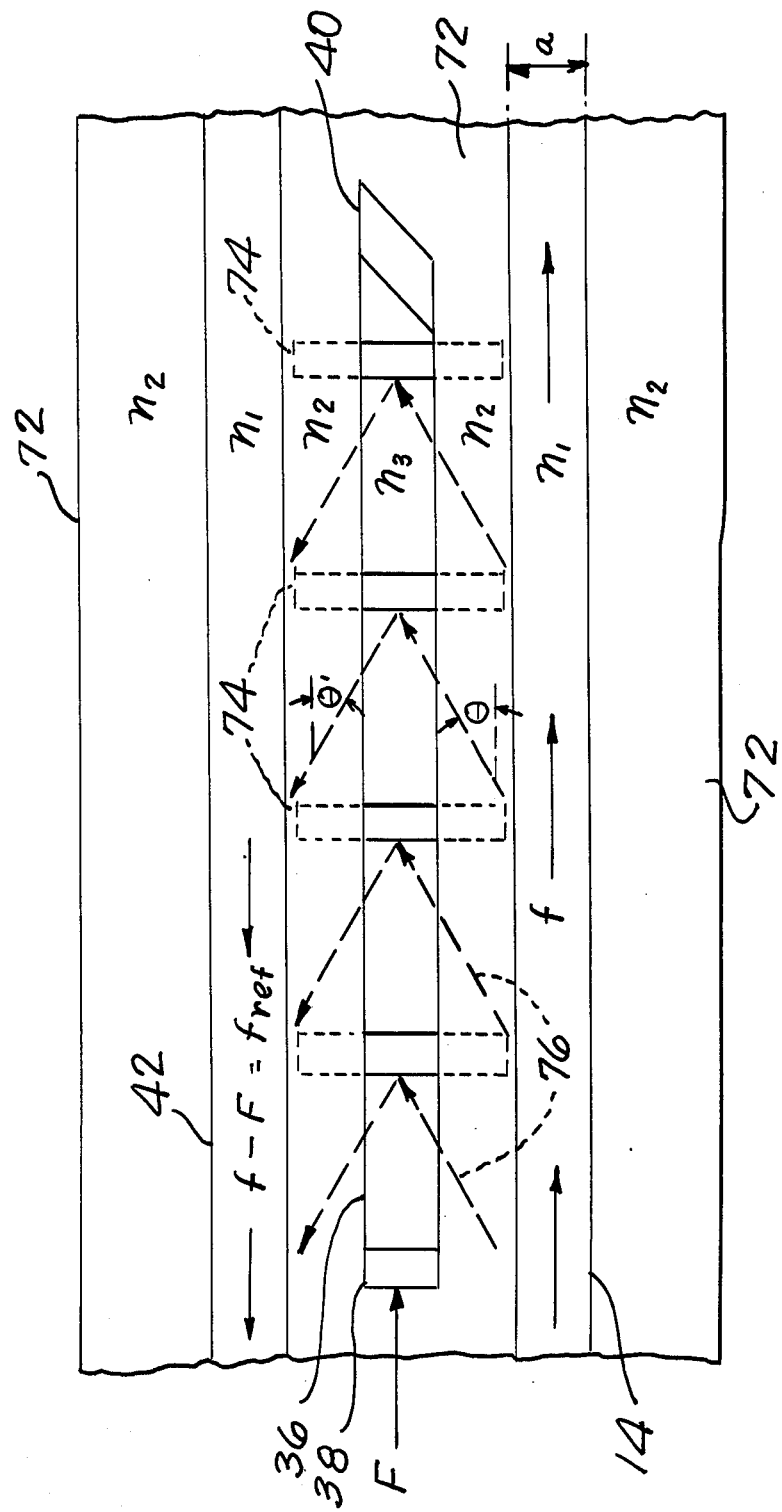
FIG. 2 is an enlarged, detailed view which schematically illustrates one of the components in the preferred embodiment of FIG. 1 and is helpful in understanding the operation thereof.

FIG. 2 shows an enlarged sketch of the backscattering technique. Radiation f is moving at a small angle into the matrix surrounding guide 14 where it scatters off of the acoustic waves 74 which are moving into the matrix surrounding the waveguide 36. The optical guides in FIGS. 1 and 2 are considered to be single mode which means that the angle of the radiation with respect to core center line never exceeds some very small angle such as 2°. The acousto-optic driving frequency F can be determined from the equation $\lambda/\Lambda = \sin\theta + \sin\theta'$. As an example, the waveguide 36 might be made of YAG (Yttrium Aluminum Garnet; $\eta = 1.83$, velocity of acoustic propagation $= 8.6 \times 10^3$ meters/sec.). With $\theta = 2°$ and $\theta' = 2°$, the wavelength is 8.295 microns. The acoustic drive frequency F would, therefore, be $8.6 \times 10^3/16.590 \times 10^{-6}$ or $0.518377 \times 10^9$ Hz.

The optical waveguides operate single mode when $(2\pi a/\lambda)(n_1^2 - n_2^2)^{\frac{1}{2}}$ is less than 2.4; where a is the radius of the waveguide core, $\lambda$ is the freespace wavelength of radiation, $n_1$ is the index of the core, and $n_2$ is the index of the matrix. Using YAG as an example of an optical waveguide and a core radius of 20 microns, the matrix index of refraction $n_2$ would have to be 0.0001122 less than the core for single mode operation.

The fringe shaft, S, of a multiple turn interferometer is equal to $4\pi R^2 N\Omega/\lambda$ C, where R is the radius of the turns, N is the number of turns, $\pi$ is the rotation rate, $\lambda$ is freespace coherent radiation wavelength, and C is the freespace velocity of light. This can be rewritten to 2 RL$\Omega/\lambda$ C where L is the total length of the multiturn interferometer 30. For greatest sensitivity, L and R should both be maximized. The length L is normally limited by laser signal level, losses, and waveguide imperfections to a few thousand meters. The radius R needs to be very large for high sensitivity but very small for a compact field use interferometer. The radius is, therefore, a compromise.

Measuring fringe shifts at the laser frequency is difficult and/or cumbersome but it becomes much easier at frequency F where F is 518.377 MHz as in the above example. The angular phase shift between $F_{CW}$ and $F_{CCW}$ is the same as between $f_{CW}$ and $f_{CCW}$. The periods, however, differ by F/f. In the example, the ratio is $2.830 \times 10^{14}/0.518 \times 10^9$ or $5.459712 \times 10^5$. The time phase shift at the lower frequency is, therefore, about $5.46 \times 10^5$ times as long at the higher frequency. The frequency F (518.377 MHz) driving the acousto-optic waveguide 36 may, if desired, be divided down by a factor such as $2^{20}$ to obtain a still lower reference frequency of 494.3628 Hz. This low frequency may be added to the 518.377 MHz reference and heterodyned with the frequency F detected by $D_2$ and $D_3$ of FIG. 1. The time phase shift measured at 494.3628 Hz is longer by $2^{20}$ than that measured at frequency F. The present invention thus lends itself to electronic processing to greatly enhance the resolution of the multiturn fiber interferometer.

Obviously, numerous modifications and variations of the present invention are possible in light of the above teachings. It is therefore to be understood that within the scope of the appended claims, the invention may be practiced otherwise than as specifically described herein.

I claim as my invention:

1. A rotary motion sensor, which comprises:
   means for generating a coherent optical signal at a first frequency;
   a multiple-turn fiber interferometer coupled to receive said coherent optical signal from said generating means and having first and second ends for respectively transmitting said coherent optical signal in first and second opposed directions therein;
   means coupled to receive said coherent optical signal from said multiple-turn fiber interferometer and said reference optical signal from said means for generating same for mixing said coherent optical signals transmitted in said first and second directions with said reference optical signal to produce first and second signals each at said second frequency; and
   means coupled to receive the output from said mixing means for detecting the relative phase shift between said first and second signals.

2. The rotary motion sensor as set forth in claim 1, wherein said means for generating a reference optical signal comprises an acousto-optic grating driven at an acoustic frequency which equals said second frequency.

3. The rotary motion sensor as set forth in claim 1, wherein said means for generating said coherent optical signal comprises a fiber laser, and further comprising first waveguide means for receiving said coherent optical signal from said fiber laser, said means for generating said reference optical signal being positioned adjacent said first waveguide means.

4. The rotary motion sensor as set forth in claim 3, wherein said means for generating said reference optical signal also comprises means for coupling a portion of said coherent optical signal into a second waveguide means also positioned adjacent said reference optical signal generating means.

5. The rotary motion sensor as set forth in claim 4, wherein said means for generating said reference optical signal comprises an acousto-optic waveguide having transducer means positioned at one end thereof for generating traveling acoustic waves along said acousto-optic waveguide at said second frequency.

6. The rotary motion sensor as set forth in claim 5, further comprising means for coupling said coherent optical signal from said first waveguide means into said first and second ends of said multiple-turn fiber interferometer for producing a pair of signals traveling in said first and second opposed directions in said fiber interferometer.

7. The rotary motion sensor as set forth in claim 6, wherein said means for coupling comprises first and second directional couplers.

8. The rotary motion sensor as set forth in claim 6, further comprising means for extracting said pair of signals from said multiple turn fiber interferometer after said pair of signals have each respectively traversed the length of said fiber interferometer.

9. The rotary motion sensor as set forth in claim 8, wherein said means for extracting comprises third and fourth directional couplers positioned respectively near said first and second ends of said fiber interferometer for receiving said optical signals traveling in said second and first directions, respectively.

10. The rotary motion sensor as set forth in claim 9, wherein said mixing means comprises first and second heterodyne detectors each connected to receive said reference optical signal from said second waveguide means, and connected to receive the signals from said third and fourth directional couplers, respectively.

* * * * *

UNITED STATES PATENT AND TRADEMARK OFFICE
CERTIFICATE OF CORRECTION

PATENT NO.   : 4,138,196
DATED        : FEB. 6, 1979
INVENTOR(S)  : CHARLES M. REDMAN

It is certified that error appears in the above—identified patent and that said Letters Patent is hereby corrected as shown below:

Claim 1 should read as follows:

A rotary motion sensor, which comprises:

means for generating a coherent optical signal at a first frequency;

<u>means for generating a reference optical signal offset in frequency from said first frequency by a second frequency;</u> a multiple-turn fiber interferometer coupled to receive said coherent optical signal from said generating means and having first and second ends for respectively transmitting said coherent optical signal in first and second opposed directions therein;

means coupled to receive said coherent optical signal from said multiple-turn fiber interferometer and said reference optical signal from said means for generating same for mixing said coherent optical signals transmitted in said first and second directions with said reference optical signal to produce first and second signals each at said second frequency; and means coupled to receive the output from said mixing means for detecting the relative phase shift between said first and second signals.

Signed and Sealed this

Twenty-eighth Day of July 1981

[SEAL]

Attest:

GERALD J. MOSSINGHOFF

*Attesting Officer*  *Commissioner of Patents and Trademarks*